(12) United States Patent
Fan et al.

(10) Patent No.: US 8,735,484 B1
(45) Date of Patent: May 27, 2014

(54) AMORPHOUS COPOLYESTER, SUBSTRATE, AND OPTICAL FILM

(71) Applicant: Industrial Technology Research Institute, Hsinchu (TW)

(72) Inventors: Cheng-Hsing Fan, Taichung (TW); Kuo-Chen Shih, Kaohsiung (TW); Ming-Tsong Leu, Qishan Town (TW); Li-Cheng Jheng, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/728,565

(22) Filed: Dec. 27, 2012

(30) Foreign Application Priority Data

Nov. 21, 2012 (TW) .............................. 101143374 A (51) Int. Cl.
*C08K 3/26* (2006.01)

(52) U.S. Cl.
USPC ........... 524/425; 524/423; 524/430; 524/437; 524/492; 524/493; 524/497

(58) Field of Classification Search
USPC .......... 524/423, 425, 430, 437, 492, 493, 497
See application file for complete search history.

(56) References Cited

U.S. PATENT DOCUMENTS

| | | | |
|---|---|---|---|
| 5,139,727 A | 8/1992 | Utsumi et al. | |
| 5,314,954 A | 5/1994 | Ohishi et al. | |
| 5,530,086 A | 6/1996 | Fuji et al. | |
| 6,447,859 B2 | 9/2002 | Oguro et al. | |
| 6,542,292 B2 | 4/2003 | Onomichi et al. | |
| 6,586,515 B1 | 7/2003 | Koike | |
| 7,067,186 B2 | 6/2006 | Oguro et al. | |
| 7,348,079 B2 | 3/2008 | Murayama et al. | |
| 7,501,194 B2 | 3/2009 | Murayama et al. | |
| 7,741,001 B2 | 6/2010 | Kamoto | |
| 8,071,677 B2 * | 12/2011 | Chen et al. ................... | 524/605 |
| 2001/0005278 A1 | 6/2001 | Onomichi et al. | |
| 2002/0010309 A1 | 1/2002 | Oguro et al. | |
| 2004/0110038 A1 | 6/2004 | Murayama et al. | |
| 2005/0075466 A1 | 4/2005 | Oguro et al. | |
| 2005/0233179 A1 | 10/2005 | Murayama et al. | |
| 2006/0222992 A1 | 10/2006 | Kamoto | |
| 2006/0257760 A1 | 11/2006 | Mori et al. | |
| 2007/0020550 A1 | 1/2007 | Kamoto | |
| 2010/0106096 A1 | 4/2010 | Hirokane et al. | |
| 2011/0244156 A1 | 10/2011 | Lock et al. | |
| 2012/0149830 A1 | 6/2012 | Wu et al. | |
| 2013/0150532 A1 * | 6/2013 | Jheng et al. ................... | 525/444 |

FOREIGN PATENT DOCUMENTS

| | | | |
|---|---|---|---|
| EP | 2 650 317 | * | 10/2013 |
| JP | 4-27522 A | | 1/1992 |
| TW | 200631985 | | 9/2006 |
| TW | 201223996 A1 | | 6/2012 |
| WO | WO 2012/077700 | * | 6/2012 |

OTHER PUBLICATIONS

Dulmage et al., "Structure of Drawn Polyethylene Terephthalate," Journal of Polymer Science, vol. XXXI, 1958, pp. 499-512.
Hahn et al., "Compensation method for zero birefringence in oriented polymers," Polymer, vol. 26, Oct. 1985, pp. 1619-1622.
Kawasaki et al., "Preparation of a Novel Alloy Composed of Fluorene-Based Polyester and Polycarbonate and their Properties for the Optical Uses," Journal of Applied Polymer Science, vol. 111, 2009, pp. 461-468.
Ohkita et al., "Preparation of a Zero-Birefringence Polymer Doped with a Birefringent Crystal and Analysis of Its Characteristics," Macromolecules, vol. 37, No. 22, 2004, pp. 8342-8348.
Sakurai et al., "Optical Properties of a Low Birefringence Polyester Containing Fluorene Side Chain I," Polymer Journal, vol. 32, No. 8, 2000, pp. 676-682.

* cited by examiner

*Primary Examiner* — Peter Szekely
(74) *Attorney, Agent, or Firm* — Birch, Stewart, Kolasch & Birch LLP (57) ABSTRACT

Disclosed is an amorphous copolyester polymerized of a diacid and diols. The diacid is selected from a group consisting of terephthalic acid, 5-tert-butylisophthalic acid, and dimethyl 2,6-naphthalenedicarboxylate. The diols are selected at least two from a group consisting of ethylene glycol, 2,2-dimethyl-1,3-propanediol, and tricyclodecanedimethanol. The molar ratio of the tricyclodecanedimethanol is 30% to 95% of the diols.

18 Claims, 8 Drawing Sheets

AMORPHOUS COPOLYESTER, SUBSTRATE, AND OPTICAL FILM

CROSS REFERENCE TO RELATED APPLICATIONS

The present application is based on, and claims priority from, Taiwan Application Serial Number 101143374, filed on Nov. 21, 2012, the disclosure of which is hereby incorporated by reference herein in its entirety

TECHNICAL FIELD

The technical field relates to a copolyester, and in particular, to an amorphous copolyester.

BACKGROUND

Polyester film is an excellent plastic film, which can be applied as a peripheral material of a computer, e.g. keyboard, panel protection film, electrical insulative material for a panel back light module, or a magnetic substrate such as a computer magnetic tape. Alternately, the polyester film can be applied as food package, plated metal film, electrical insulative material, stationery, another livelihood industry, or another industry.

In general, the polyester film has excellent properties, e.g. high tensile strength, good impact resistance, high melting point for being used at a higher temperature. As such, the polyester film may serve as a protective material or a substrate material. Next, the polyester film has high transmittance, brightness, and smooth surface for being used in tag, adhering, printing, or the likes. The polyester film also withstand a high voltage, thereby being an electrical insulative material for wrapping wire, an insulative tape, a motor transformer, a capacitor, or the likes. The polyester film is not dissolved in organic solvents. Moreover, the polyester film has excellent acid resistance and oil resistance.

Since 1953, biaxial oriented polyester film is developed for various fields. The biaxial oriented polyester film is widely applied in electronics, equipments, magnetic records, packages, plate making printings, photosensitive materials due to its excellent physical and chemical properties.

The biaxial oriented polyester film is the major packaging material for high performance application or higher level products. For example, the biaxial oriented polyester film may serve as a brightness enhancement film substrate of a backlight module in a panel flat display (PFD), a protection film of optical degree and release film for a polarizer plate, an ITO substrate of a touch panel, and the likes.

The biaxial oriented polyester film for the PFD should simultaneously meet the requirements of high transmittance and low birefringence. In other words, a novel biaxial oriented polyester film is still called-for.

SUMMARY

One embodiment of the disclosure provides an amorphous copolyester, polymerized of a diacid and diols, wherein the diacid is selected from a group consisting of terephthalic acid, 5-tert-butylisophthalic acid, and dimethyl 2,6-naphthalenedicarboxylate, wherein the diols are selected at least two from a group consisting of ethylene glycol, 2,2-dimethyl-1,3-propanediol, and tricyclodecanedimethanol, and the molar ratio of the tricyclodecanedimethanol is 30% to 95% of the diols.

One embodiment of the disclosure provides a substrate comprising the described amorphous copolyester.

One embodiment of the disclosure provides an optical film comprising the described amorphous copolyester.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In embodiments of the disclosure, different monomers are condensation polymerized to form a thin plate of a random amorphous copolyester. The thin plate is then biaxial stretched to form a copolyester film.

In one embodiment, the diacid is selected from a group consisting of terephthalic acid (TPA), 5-tert-butylisophthalic acid (5tBIA), and dimethyl 2,6-naphthalenedicarboxylate (NDC) which is copolymerized to form the amorphous copolyester. The diols are selected at least two from a group consisting of ethylene glycol (EG), 2,2-dimethyl-1,3-propanediol (DMPD), and tricyclodecanedimethanol (TCD) which is copolymerized to form the amorphous copolyester. Note that the molar ratio of tricyclodecanedimethanol is about 30% to 95% of the diols (which means the tricyclodecanedimethanol occupies a molar ratio of 30% to 95% of the diols). In one embodiment, an overly high molar ratio of the tricyclodecanedimethanol may make the copolyester too brittle to form a film. In another embodiment, an overly low molar ratio of the tricyclodecanedimethanol may make the copolyester crystallize, such that the copolyester has an overly high birefringence and an overly low thermal resistance. In one embodiment, the amorphous copolyester has an intrinsic viscosity of about 0.5 dL/g to 0.8 dL/g.

In one embodiment, the diacid and the diols are esterified and then condensation polymerized by two steps to form the amorphous copolyester. The copolyester has an A molar ratio of a repeating unit as shown in Formula 1, and a B molar ratio of a repeating unit as shown in Formula 2. A+B=1, and 0.3≤A≤0.95. The molar ratios of A and B are determined by the DMPD and TCD amounts. In one embodiment, a condensation polymerization catalyst such as an antimony-based catalyst, a titanium-based catalyst, a germanium-based catalyst, a tin-based catalyst, a gallium-based catalyst, an aluminum-based catalyst, or combinations thereof can be added during polymerization. In one embodiment, the catalyst is antimony acetate or tetra-butyl titanate. The catalyst content is of about 25 ppm to 500 ppm.

(Formula 1)

(Formula 2)

In one embodiment, the amorphous copolyester composed of the repeating units as shown in Formulae 1 and 2 has an intrinsic viscosity of about 0.5 dL/g to 0.8 dL/g. In one embodiment, the amorphous copolyester composed of the repeating units as shown in Formulae 1 and 2 having an overly high intrinsic viscosity cannot be easily processed due to low flowability. In another embodiment, the amorphous copolyester composed of the repeating units as shown in Formulae 1 and 2 having an overly low intrinsic viscosity cannot form a film due to low mechanical properties.

In addition, the repeating unit as shown in Formula 1 may have the chemical structure of Formulae 3 to 8 or combinations thereof, which is determined by the TCD structure.

(Formula 3)

(Formula 4)

(Formula 5)

(Formula 6)

(Formula 7)

(Formula 8)

In one embodiment, the diacid and the diols are esterified and then condensation polymerized by two steps to form the amorphous copolyester. The copolyester has a C molar ratio of a repeating unit as shown in Formula 9, and a D molar ratio of a repeating unit as shown in Formula 10.

C+D=1, and 0.3≤C≤0.95. The molar ratios of C and D are determined by the EG and TCD amounts. In one embodiment, a condensation polymerization catalyst such as an antimony-based catalyst, a titanium-based catalyst, a germanium-based catalyst, a tin-based catalyst, a gallium-based catalyst, an aluminum-based catalyst, or combinations thereof can be added during polymerization. In one embodiment, the catalyst is antimony acetate or tetra-butyl titanate. The catalyst content is of about 25 ppm to 500 ppm.

(Formula 9)

(Formula 10)

In one embodiment, the amorphous copolyester composed of the repeating units as shown in Formulae 9 and 10 has an intrinsic viscosity of about 0.5 dL/g to 0.8 dL/g. In one embodiment, the amorphous copolyester composed of the repeating units as shown in Formulae 9 and 10 having an overly high intrinsic viscosity cannot be easily processed due to low flowability. In another embodiment, the amorphous copolyester composed of the repeating units as shown in Formulae 9 and 10 having an overly low intrinsic viscosity cannot form a film due to low mechanical properties.

In addition, the repeating unit as shown in Formula 9 may have the chemical structure of Formulae 11 to 16 or combinations thereof, which is determined by the TCD structure.

(Formula 11)

(Formula 12)

(Formula 13)

(Formula 14)

(Formula 15)

(Formula 16)

In one embodiment, the diacid and the diols are esterificated and then condensation polymerized by two steps to form the amorphous copolyester. The copolyester has E molar ratio of a repeating unit as shown in Formula 17, and F molar ratio of a repeating unit as shown in Formula 18. E+F=1, and $0.3 \leq E \leq 0.95$. The molar ratios of E and F are determined by the EG and TCD amounts. In one embodiment, a condensation polymerization catalyst such as an antimony-based catalyst, a titanium-based catalyst, a germanium-based catalyst, a tin-based catalyst, a gallium-based catalyst, an aluminum-based catalyst, or combinations thereof can be added during polymerization. In one embodiment, the catalyst is antimony acetate or tetra-butyl titanate. The catalyst content is of about 25 ppm to 500 ppm.

(Formula 17)

(Formula 18)

In one embodiment, the amorphous copolyester composed of the repeating units as shown in Formulae 17 and 18 has an intrinsic viscosity of about 0.5 dL/g to 0.8 dL/g. In one embodiment, the amorphous copolyester composed of the repeating units as shown in Formulae 17 and 18 having an overly high intrinsic viscosity cannot be easily processed due to low flowability. In another embodiment, the amorphous copolyester composed of the repeating units as shown in Formulae 17 and 18 having an overly low intrinsic viscosity cannot form a film due to low mechanical properties.

In addition, the repeating unit as shown in Formula 17 may have the chemical structure of Formulae 19 to 24 or combinations thereof, which is determined by the TCD structure.

(Formula 19)

(Formula 20)

(Formula 21)

(Formula 22)

(Formula 23)

(Formula 24)

As described above, different monomers can be introduced into the polymer by condensation polymerization, thereby forming the random amorphous copolyester. In one embodiment, inorganic nano powders can be added into the diacid and the diols, and the diacid and the diols are then polymerized. The inorganic nano powders mixed in the amorphous copolyester may reduce the birefringence of the amorphous copolyester. The inorganic nano powders can be silicon oxide, titanium oxide, calcium carbonate, strontium carbonate, barium sulfate, aluminum oxide, or combinations thereof. The inorganic nano powders can be layered structure with a high aspect ratio, such as modified clay with different aspect ratios. The inorganic nano powders and the amorphous polyester have a weight ratio of larger than 0:100 and less than or equal to 1:100 (0:100<w/w≤1:100). An overly high amount of the inorganic nano powders may reduce the light transmittance of the copolyester film. The copolyester (or mixed with the inorganic nano powders) is then molten and processed by a twin screw extruder with a screw rotation rate of about 200 rpm to 800 rpm at a temperature of 220° C. to 300° C. Thereafter, the molten copolyester is extruded by a T-die to form a plate. The plate then passes through a casting drum to achieve a uniform thickness. The casting temperature is usually lower than the glass transition temperature (Tg) of the copolyester, such that the molten copolyester is quickly cooled.

Subsequently, the extruded amorphous copolyester plate is biaxial stretched to form a film. For example, the plate can be stretched by one step or step by step in a hot air circulating oven. Alternatively, the biaxial stretching is a continuous two-step stretching process. First, the plate is stretched according to a longitudinal direction of the plate by a heated roll, thereby increasing the tensile strength in the machine direction (MD) of the film. Next, the stretched plate is heated by circulating hot air and then stretched according to a transverse direction (TD) of the plate in an oven. If the plate is simultaneously biaxially stretched in one step by a biaxial stretching machine (Bruckner KARO IV), the copolyester molecules in the plate will be orientated during the stretching, thereby forming an anisotropic film. The plate can be simultaneously biaxially stretched to form the film at a stretching temperature of about 90° C. to 160° C., a hot air circulating motor rotation rate of 1400 rpm to 1800 rpm, and a stretching rate of 1 mm/sec to 100 mm/sec for a stretching times (length×width) of 1×1 to 6.5×6.5.

The film was then thermal treated at a specific temperature for a period. The biaxially stretched polymer chains of the film are straightened by external stress, such that the polymer molecules move to largely deform. If the film is directly cooled to a temperature lower than the Tg of the film when molded, internal stress will remain in molecules. As such, the dimension of the directly cooled film was unstable. In other words, thermal setting treatment is for the film to have low thermal contraction. The thermal setting treatment may relax short chains or branch chains of the stretched polymer, thereby eliminating the internal stress and thermal contraction of the film. In one embodiment, the thermal treatment is performed at a temperature of about 80° C. to 130° C. for a period of about 3 seconds to 180 seconds.

A single layered and non-stretched plate composed of the polymer can be directly extruded by a twin screw extruder. Alternatively, the polymer can be extruded to form strips and then cut to form pellets. The pellets are thermal pressed to form the single layered and non-stretched plate.

Because the copolyester has a low retardation variation and an excellent light transmittance after being stretched, it may serve as a substrate of a flexible electronic device. Furthermore, the copolyester may serve as a substrate (e.g. light guide plate, diffusion film, or touch panel) of a display device, or an optical film (e.g. an optical protective film of a liquid crystal display, a release film, a brightness enhancement film, a retardation film, a polarizer protective film, or an anti-reflection film) on the substrate.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Comparative Example 1

PET pellets were vibration sieved by a screen mesh to remove fine dust and fragments thereon. The sieved PET pellets were then dried by a hot air circulating oven at 70° C. for 24 hours to ensure that the PET pellets were completely dried. The physical properties of the dried PET pellets were tested as shown in Table 1.

100 parts by weight of PET was molten and processed by a twin screw extruder with a screw rotation rate of about 300 rpm to 500 rpm at a temperature of 270° C. to 280° C. Thereafter, the molten PET was extruded by a T-die to form a transparent plate. The transparent plate was then passed through a casting drum at a temperature of 60° C. to 70° C. to achieve a uniform thickness. The plate was cut to 117 mm×117 mm, and then simultaneously biaxially stretched at a stretching temperature of 90° C. to 100° C., a hot air circulating motor rotation rate of 1700 rpm, and a stretching rate of 10 mm/sec to 100 mm/sec for a biaxially stretching times (length×width) of 1.25×1.25 to 4×4 for forming films. The films were thermal treated at a temperature of 190° C. to 210° C. for 3 seconds to 9 seconds, and the physical properties of the films were measured and tabulated in Table 2.

Comparative Example 2

166 g of TPA serving as diacid and 93.6 g of DMPD (90 mol %) and 19.6 g of TCD (10 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.1 molar ratio of the repeating unit in Formula 1 and 0.9 molar ratio of the repeating unit in Formula 2 (A=0.1, B=0.9) was obtained. The intrinsic viscosity (0.69 dL/g) of the amorphous copolyester was measured by the Ubbelohde viscometer.

Comparative Example 3

222 g of 5tBIA serving as diacid and 74.4 g of EG (90 mol %) and 19.6 g of TCD (10 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.1 molar ratio of the repeating unit in Formula 9 and 0.9 molar ratio of the repeating unit in Formula 10 (C=0.1, D=0.9) was obtained. The intrinsic viscosity (0.70 dL/g) of the amorphous copolyester was measured by the Ubbelohde viscometer.

Comparative Example 4

244 g of NDC serving as diacid and 74.4 g of EG (90 mol %) and 19.6 g of TCD (10 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.1 molar ratio of the repeating unit in Formula 17 and 0.9 molar ratio of the repeating unit in Formula 18 (E=0.1, F=0.9) was obtained. The intrinsic viscosity (0.65 dL/g) of the amorphous copolyester was measured by the Ubbelohde viscometer.

Example 1

166 g of TPA serving as diacid and 72.8 g of DMPD (70 mol %) and 58.8 g of TCD (30 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.3 molar ratio of the repeating unit in Formula 1 and 0.7 molar ratio of the repeating unit in Formula 2 (A=0.3, B=0.7) was obtained. The intrinsic viscosity (0.70 dL/g) of the amorphous copolyester was measured by the Ubbelohde viscometer.

Example 2

166 g of TPA serving as diacid and 31.2 g of DMPD (30 mol %) and 137.2 g of TCD (70 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 1 and 0.3 molar ratio of the repeating unit in Formula 2 (A=0.7, B=0.3) was obtained. The intrinsic viscosity (0.69 dL/g) of the amorphous copolyester was measured by the Ubbelohde viscometer.

Example 3

166 g of TPA serving as diacid and 5.2 g of DMPD (5 mol %) and 186.2 g of TCD (95 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.95 molar ratio of the repeating unit in Formula 1 and 0.05 molar ratio of the repeating unit in Formula 2 (A=0.95, B=0.05) was obtained. The intrinsic viscosity (0.68 dL/g) of the amorphous copolyester was measured by the Ubbelohde viscometer.

Example 4

166 g of TPA serving as diacid, 31.2 g of DMPD (30 mol %) and 137.2 g of TCD (70 mol %) serving as diols, and 0.5 wt % (based on the diacid and the diols) of silicon oxide serving as inorganic nano powders were mixed to form a mixture. The diacid and the diols of the mixture were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 1 and 0.3 molar ratio of the repeating unit in Formula 2 (A=0.7, B=0.3) was obtained. The intrinsic viscosity (0.68 dL/g) of the amorphous copolyester was measured by the Ubbelohde viscometer.

Example 5

166 g of TPA serving as diacid, 31.2 g of DMPD (30 mol %) and 137.2 g of TCD (70 mol %) serving as diols, and 0.5 wt % (based on the diacid and the diols) of strontium carbonate serving as inorganic nano powders were mixed to form a mixture. The diacid and the diols of the mixture were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 1 and 0.3 molar ratio of the repeating unit in Formula 2 (A=0.7, B=0.3) was obtained. The intrinsic viscosity (0.69 dL/g) of the amorphous copolyester was measured by the Ubbelohde viscometer.

Example 6

222 g of 5tBIA serving as diacid and 62 g of EG (70 mol %) and 58.8 g of TCD (30 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.3 molar ratio of the repeating unit in Formula 9 and 0.7 molar ratio of the repeating unit in Formula 10 (C=0.3, D=0.7) was obtained. The intrinsic viscosity (0.69 dL/g) of the amorphous copolyester was measured by the Ubbelohde viscometer.

Example 7

222 g of 5tBIA serving as diacid and 37.2 g of EG (30 mol %) and 137.2 g of TCD (70 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 9 and 0.3 molar ratio of the repeating unit in Formula 10 (C=0.7, D=0.3) was obtained. The intrinsic viscosity (0.71 dL/g) of the amorphous copolyester was measured by the Ubbelohde viscometer.

Example 8

222 g of 5tBIA serving as diacid and 21.7 g of EG (5 mol %) and 186.2 g of TCD (95 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.95 molar ratio of the repeating unit in Formula 9 and 0.05 molar ratio of the repeating unit in Formula 10 (C=0.95, D=0.05) was obtained. The intrinsic viscosity (0.70 dL/g) of the amorphous copolyester was measured by the Ubbelohde viscometer.

Example 9

222 g of 5tBIA serving as diacid, 37.2 g of EG (30 mol %) and 137.2 g of TCD (70 mol %) serving as diols, and 0.5 wt % (based on the diacid and the diols) of silicon oxide serving as inorganic nano powders were mixed to form a mixture. The diacid and the diols of the mixture were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 9 and 0.3 molar ratio of the repeating unit in Formula 10 (C=0.7, D=0.3) was obtained. The intrinsic viscosity (0.70 dL/g) of the amorphous copolyester was measured by the Ubbelohde viscometer.

Example 10

222 g of 5tBIA serving as diacid, 37.2 g of EG (30 mol %) and 137.2 g of TCD (70 mol %) serving as diols, and 0.5 wt % (based on the diacid and the diols) of strontium carbonate serving as inorganic nano powders were mixed to form a mixture. The diacid and the diols of the mixture were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 9 and 0.3 molar ratio of the repeating unit in Formula 10 (C=0.7, D=0.3) was obtained. The intrinsic viscosity (0.69 dL/g) of the amorphous copolyester was measured by the Ubbelohde viscometer.

Example 11

244 g of NDC serving as diacid and 62 g of EG (70 mol %) and 58.8 g of TCD (30 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.3 molar ratio of the repeating unit in Formula 17 and 0.7 molar ratio of the repeating unit in Formula 18 (E=0.3, F=0.7) was obtained. The intrinsic viscosity (0.66 dL/g) of the amorphous copolyester was measured by the Ubbelohde viscometer.

Example 12

244 g of NDC serving as diacid and 37.2 g of EG (30 mol %) and 137.2 g of TCD (70 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 17 and 0.3 molar ratio of the repeating unit in Formula 18 (E=0.7, F=0.3) was obtained. The intrinsic viscosity (0.65 dL/g) of the amorphous copolyester was measured by the Ubbelohde viscometer.

Example 13

244 g of NDC serving as diacid and 21.7 g of EG (5 mol %) and 186.2 g of TCD (95 mol %) serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.95 molar ratio of the repeating unit in Formula 17 and 0.05 molar ratio of the repeating unit in Formula 18 (E=0.95, F=0.05) was obtained. The intrinsic viscosity (0.63 dL/g) of the amorphous copolyester was measured by the Ubbelohde viscometer.

Example 14

244 g of NDC serving as diacid, 37.2 g of EG (30 mol %) and 137.2 g of TCD (70 mol %) serving as diols, and 0.5 wt % (based on the diacid and the diols) of silicon oxide serving as inorganic nano powders were mixed to form a mixture. The diacid and the diols of the mixture were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 17 and 0.3 molar ratio of the repeating unit in Formula 18 (E=0.7, F=0.3) was obtained. The intrinsic viscosity (0.65 dL/g) of the amorphous copolyester was measured by the Ubbelohde viscometer.

Example 15

244 g of NDC serving as diacid, 37.2 g of EG (30 mol %) and 137.2 g of TCD (70 mol %) serving as diols, and 0.5 wt % (based on the diacid and the diols) of strontium carbonate serving as inorganic nano powders were mixed to form a mixture. The diacid and the diols of the mixture were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 0.7 molar ratio of the repeating unit in Formula 17 and 0.3 molar ratio of the repeating unit in Formula 18 (E=0.7, F=0.3) was obtained. The intrinsic viscosity (0.66 dL/g) of the amorphous copolyester was measured by the Ubbelohde viscometer.

The copolyesters of Comparative Examples 1 to 7 and Examples 1 to 15 were analyzed by the DSC to measure their Tg, as tabulated in Table 1.

TABLE 1

| | Composition | Tg (° C.) |
|---|---|---|
| Comparative Example 1 | PET | 78 |
| Comparative Example 2 | Formula 1 + Formula 2 (A/B = 0.1/0.9) | 84 |
| Comparative Example 3 | Formula 9 + Formula 10 (C/D = 0.1/0.9) | 94 |
| Comparative Example 4 | Formula 17 + Formula 18 (E/F = 0.1/0.9) | 119 |
| Comparative Example 5 | Formula 1 (A/B = 1.0/0) | 121 |
| Comparative Example 6 | Formula 9 (C/D = 1.0/0) | 128 |
| Comparative Example 7 | Formula 17 (E/F = 1.0/0) | 144 |

TABLE 1-continued

| | Composition | Tg (° C.) |
|---|---|---|
| Example 1 | Formula 1 + Formula 2 (A/B = 0.3/0.7) | 96 |
| Example 2 | Formula 1 + Formula 2 (A/B = 0.7/0.3) | 111 |
| Example 3 | Formula 1 + Formula 2 (A/B = 0.95/0.05) | 120 |
| Example 4 | Formula 1 + Formula 2 (A/B = 0.7/0.3) + $SiO_2$ | 112 |
| Example 5 | Formula 1 + Formula 2 (A/B = 0.7/0.3) + $SrCO_3$ | 113 |
| Example 6 | Formula 9 + Formula 10 (C/D = 0.3/0.7) | 104 |
| Example 7 | Formula 9 + Formula 10 (C/D = 0.7/0.3) | 118 |
| Example 8 | Formula 9 + Formula 10 (C/D = 0.95/0.05) | 126 |
| Example 9 | Formula 9 + Formula 10 (C/D = 0.7/0.3) + $SiO_2$ | 119 |
| Example 10 | Formula 9 + Formula 10 (C/D = 0.7/0.3) + $SrCO_3$ | 120 |
| Example 11 | Formula 17 + Formula 18 (E/F = 0.3/0.7) | 124 |
| Example 12 | Formula 17 + Formula 18 (E/F = 0.7/0.3) | 137 |
| Example 13 | Formula 17 + Formula 18 (E/F = 0.95/0.05) | 143 |
| Example 14 | Formula 17 + Formula 18 (E/F = 0.7/0.3) + $SiO_2$ | 138 |
| Example 15 | Formula 17 + Formula 18 (E/F = 0.7/0.3) + $SrCO_3$ | 138 |

Physical Properties of the Copolyesters

Figure 1:
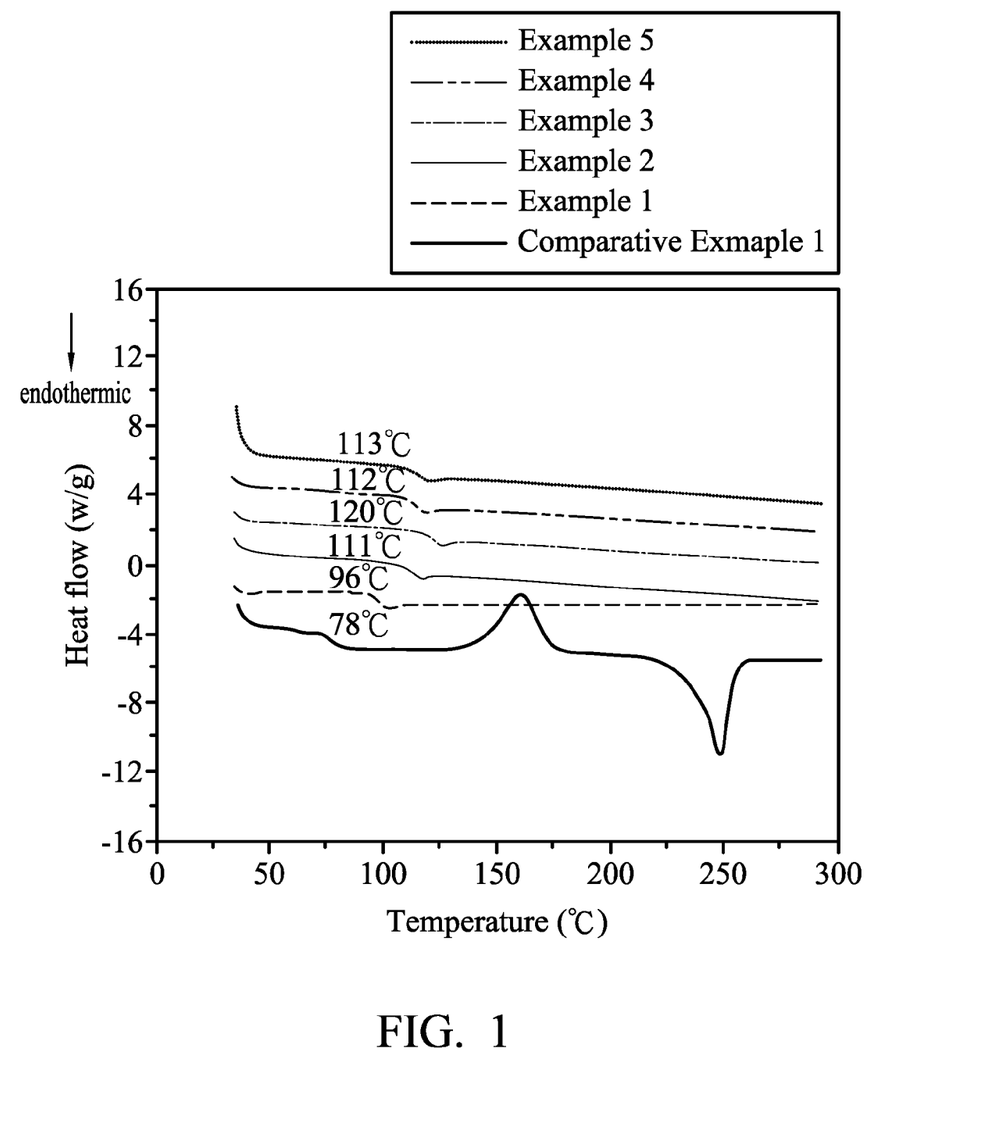
FIG. 1 shows heat flow versus temperature curves of several copolyesters analyzed by a differential scanning calorimeter in one embodiment of the disclosure.
Figure 2:
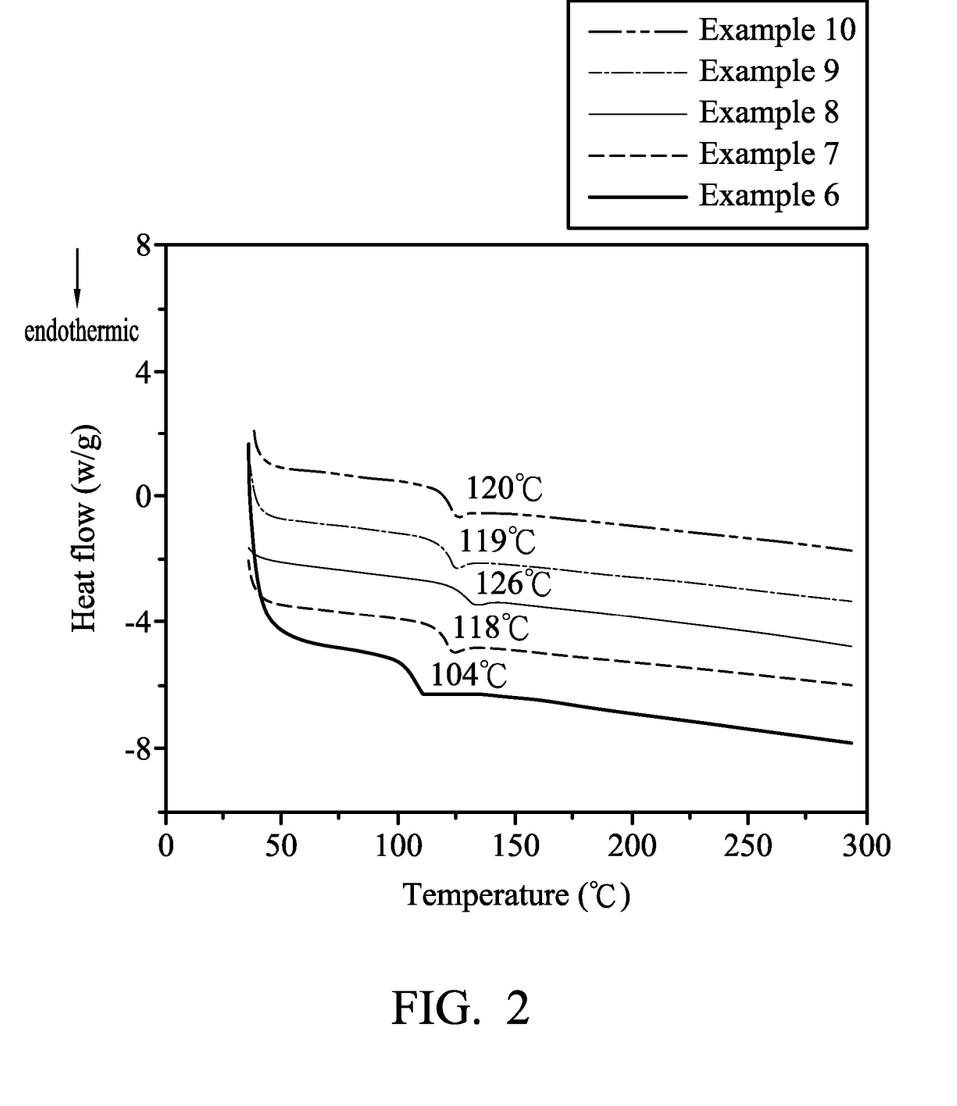
FIG. 2 shows heat flow versus temperature curves of several copolyesters analyzed by a differential scanning calorimeter in one embodiment of the disclosure.
Figure 3:
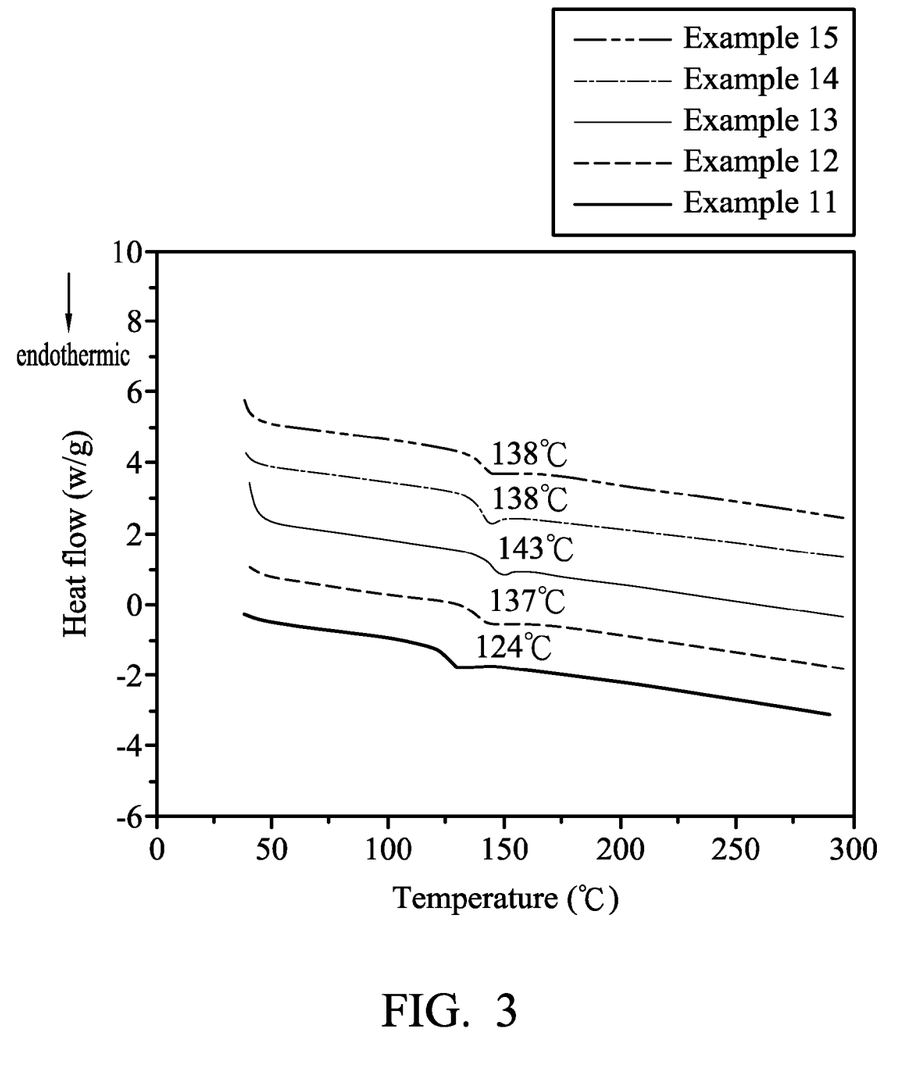
FIG. 3 shows heat flow versus temperature curves of several copolyesters analyzed by a differential scanning calorimeter in one embodiment of the disclosure.

The copolyesters of Comparative Example 1 and Examples 1 to 5 were analyzed by a differential scanning calorimeter (DSC), as shown in FIG. 1. Accordingly, the copolyesters in Examples 1 to 5 had the glass transition temperatures (Tg, 96° C. to 120° C.) which were higher than the Tg (78° C.) of PET in the Comparative Example 1. The copolyesters of Examples 6 to 10 were analyzed by the DSC, as shown in FIG. 2. Accordingly, the copolyesters in Examples 6 to 10 had the Tg (104° C. to 126° C.) which was higher than the Tg (78° C.) of the PET in the Comparative Example 1. The copolyesters of Examples 11 to 15 were analyzed by the DSC, as shown in FIG. 3. Accordingly, the copolyesters in Examples 11 to 15 had the Tg (124° C. to 143° C.) which was higher than the Tg (78° C.) of the PET in the Comparative Example 1.

Preparation and Tests for the Copolyesters Film

Copolyester pellets in Examples 1 to 15 were vibration sieved by a screen mesh to remove fine dust and fragments thereon. The sieved copolyester pellets were then dried by a hot air circulating oven at 70° C. for 24 hours to ensure that the copolyester pellets were completely dried. The dried copolyester pellets were molten and processed by a twin screw extruder with a screw rotation rate of about 300 rpm to 500 rpm at a temperature of 220° C. to 270° C. Thereafter, the molten copolyester was extruded by a T-die to form a transparent plate. The transparent plate then passed through a casting drum at a temperature of 60° C. to 70° C. to achieve a uniform thickness. The plate was cut to 117 mm×117 mm, and then simultaneously biaxially stretched at a stretching temperature of 90° C. to 160° C., a hot air circulating motor rotation rate of 1700 rpm, and a stretching rate of 10 mm/sec for a biaxially stretching times (length×width) of 1.25×1.25 to 3×3 for forming films. The films were thermal treated at a temperature of 80° C. to 100° C. for 10 seconds to 50 seconds. The physical properties such as total transmittances and birefringence coefficients of the amorphous copolyester films (having different molecular structure) stretched by different biaxially stretching times were measured and tabulated in Table 2.

TABLE 2

| | Composition | Biaxial stretching times (length × width) | Total transmittance (%) | Birefringence coefficient (550 nm) | | |
|---|---|---|---|---|---|---|
| | | | | $\Delta Nx\text{-}y$ | $\Delta Ny\text{-}z$ | $\Delta Nx\text{-}z$ |
| Comparative Example 1-1 | PET | 1.25 × 1.25 | 88.6 | $3.88 \times 10^{-4}$ | $4.22 \times 10^{-3}$ | $4.61 \times 10^{-3}$ |
| Comparative Example 1-2 | | 1.5 × 1.5 | 88.9 | $7.60 \times 10^{-4}$ | $8.76 \times 10^{-3}$ | $9.52 \times 10^{-3}$ |
| Comparative Example 1-3 | | 2 × 2 | 89.3 | $1.77 \times 10^{-3}$ | $8.87 \times 10^{-3}$ | $1.06 \times 10^{-2}$ |
| Comparative Example 1-4 | | 3 × 3 | 89.5 | $1.07 \times 10^{-2}$ | $6.62 \times 10^{-2}$ | $7.69 \times 10^{-2}$ |
| Comparative Example 1-5 | | 4 × 4 | 89.6 | $1.74 \times 10^{-2}$ | $7.78 \times 10^{-2}$ | $9.51 \times 10^{-2}$ |
| Example 2-1 | Formula 1 + Formula 2 (A/B = 0.7/0.3) | 1.5 × 1.5 | 89.8 | $5.88 \times 10^{-5}$ | $2.74 \times 10^{-4}$ | $3.02 \times 10^{-4}$ |
| Example 2-2 | | 2 × 2 | 90.4 | $9.07 \times 10^{-5}$ | $4.53 \times 10^{-4}$ | $4.77 \times 10^{-4}$ |
| Example 2-3 | | 3 × 3 | 90.7 | $3.44 \times 10^{-4}$ | $6.02 \times 10^{-4}$ | $6.74 \times 10^{-4}$ |
| Example 4-1 | Formula 1 + Formula 2 (A/B = 0.7/0.3) + $SiO_2$ | 1.5 × 1.5 | 89.6 | $4.55 \times 10^{-5}$ | $2.23 \times 10^{-4}$ | $2.34 \times 10^{-4}$ |
| Example 4-2 | | 2 × 2 | 89.9 | $8.11 \times 10^{-5}$ | $4.37 \times 10^{-4}$ | $4.43 \times 10^{-4}$ |
| Example 4-3 | | 3 × 3 | 90.2 | $2.33 \times 10^{-4}$ | $5.88 \times 10^{-4}$ | $6.22 \times 10^{-4}$ |
| Example 5-1 | Formula 1 + Formula 2 (A/B = 0.7/0.3) + $SrCO_3$ | 1.5 × 1.5 | 89.5 | $4.05 \times 10^{-5}$ | $1.06 \times 10^{-4}$ | $2.05 \times 10^{-4}$ |
| Example 5-2 | | 2 × 2 | 89.8 | $7.59 \times 10^{-5}$ | $3.55 \times 10^{-4}$ | $3.98 \times 10^{-4}$ |
| Example 5-3 | | 3 × 3 | 90.2 | $2.21 \times 10^{-4}$ | $5.25 \times 10^{-4}$ | $5.83 \times 10^{-4}$ |
| Example 7-1 | Formula 9 + Formula 10 (C/D = 0.7/0.3) | 1.5 × 1.5 | 89.7 | $6.47 \times 10^{-5}$ | $4.03 \times 10^{-4}$ | $3.54 \times 10^{-4}$ |
| Example 7-2 | | 2 × 2 | 90.3 | $1.08 \times 10^{-4}$ | $8.63 \times 10^{-4}$ | $6.71 \times 10^{-4}$ |
| Example 7-3 | | 3 × 3 | 90.5 | $6.23 \times 10^{-4}$ | $1.49 \times 10^{-3}$ | $9.63 \times 10^{-4}$ |
| Example 9-1 | Formula 9 + Formula 10 (C/D = 0.7/0.3) + $SiO_2$ | 1.5 × 1.5 | 89.5 | $5.01 \times 10^{-5}$ | $3.55 \times 10^{-4}$ | $3.22 \times 10^{-4}$ |
| Example 9-2 | | 2 × 2 | 89.9 | $9.22 \times 10^{-5}$ | $7.05 \times 10^{-4}$ | $6.08 \times 10^{-4}$ |
| Example 9-3 | | 3 × 3 | 90.1 | $4.85 \times 10^{-4}$ | $1.01 \times 10^{-3}$ | $8.57 \times 10^{-4}$ |
| Example 10-1 | Formula 9 + Formula 10 | 1.5 × 1.5 | 89.6 | $4.87 \times 10^{-5}$ | $3.35 \times 10^{-4}$ | $2.99 \times 10^{-4}$ |

TABLE 2-continued

| Composition | Biaxial stretching times (length × width) | Total transmittance (%) | Birefringence coefficient (550 nm) | | |
|---|---|---|---|---|---|
| | | | ΔNx-y | ΔNy-z | ΔNx-z |
| Example 10-2 (C/D = 0.7/0.3) + SrCO$_3$ | 2 × 2 | 89.9 | $9.01 \times 10^{-5}$ | $6.88 \times 10^{-4}$ | $5.88 \times 10^{-4}$ |
| Example 10-3 | 3 × 3 | 90.2 | $4.21 \times 10^{-4}$ | $9.95 \times 10^{-4}$ | $8.12 \times 10^{-4}$ |
| Example 12-1 Formula 17 + Formula 18 | 1.5 × 1.5 | 89.5 | $1.94 \times 10^{-4}$ | $9.46 \times 10^{-4}$ | $1.14 \times 10^{-3}$ |
| Example 12-2 (E/F = 0.7/0.3) | 2 × 2 | 89.7 | $3.13 \times 10^{-4}$ | $2.08 \times 10^{-3}$ | $2.40 \times 10^{-3}$ |
| Example 12-3 | 3 × 3 | 90.0 | $1.08 \times 10^{-3}$ | $2.47 \times 10^{-3}$ | $3.59 \times 10^{-3}$ |
| Example 14-1 Formula 17 + Formula 18 | 1.5 × 1.5 | 89.4 | $1.68 \times 10^{-4}$ | $8.79 \times 10^{-4}$ | $1.05 \times 10^{-3}$ |
| Example 14-2 (E/F = 0.7/0.3) + SiO$_2$ | 2 × 2 | 89.5 | $2.57 \times 10^{-4}$ | $1.82 \times 10^{-3}$ | $2.08 \times 10^{-3}$ |
| Example 14-3 | 3 × 3 | 89.7 | $6.50 \times 10^{-4}$ | $2.14 \times 10^{-3}$ | $2.39 \times 10^{-3}$ |
| Example 15-1 Formula 17 + Formula 18 | 1.5 × 1.5 | 89.3 | $1.42 \times 10^{-4}$ | $8.03 \times 10^{-4}$ | $9.89 \times 10^{-4}$ |
| Example 15-2 (E/F = 0.7/0.3) + SrCO$_3$ | 2 × 2 | 89.6 | $2.33 \times 10^{-4}$ | $1.64 \times 10^{-3}$ | $1.78 \times 10^{-3}$ |
| Example 15-3 | 3 × 3 | 89.7 | $6.01 \times 10^{-4}$ | $2.02 \times 10^{-3}$ | $2.21 \times 10^{-3}$ |

As shown in Table 2, all the copolyester films in Examples 2, 4, 5, 7, 9, 10, 12, 14, and 15 stretched by different biaxial stretching times had a higher transmittance than the copolyester film in the Comparative Example 1.

The PET is a crystalline material, and it should be biaxially stretched to at least 4×4 to achieve sufficient thermal resistance as an optical film in practice. The PET film biaxially stretched to 4×4 had a birefringence coefficient (ΔNx-y) of $1.74 \times 10^{-2}$, and the birefringence coefficient of the PET film obviously increased with the increase of the biaxially stretching times.

Figure 4:
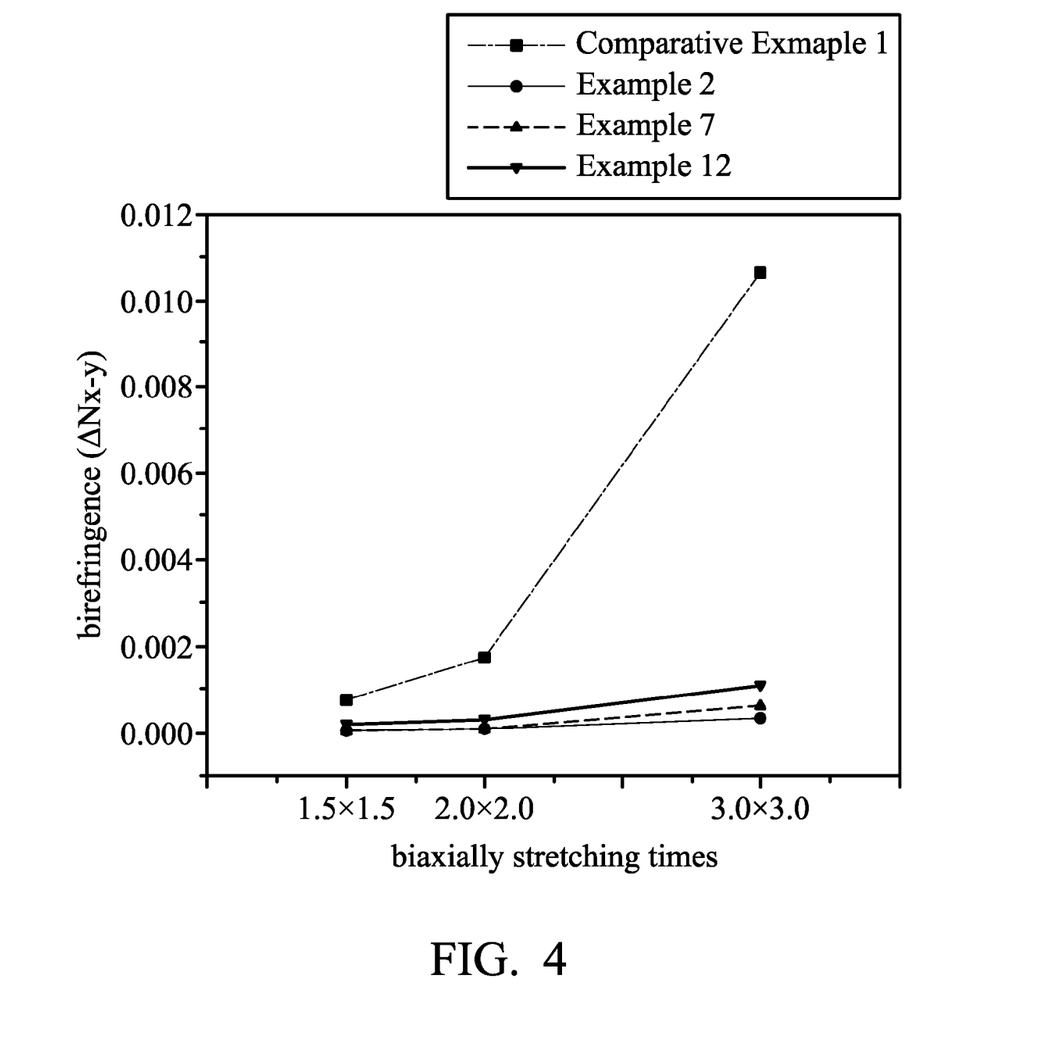
FIG. 4 shows birefringence ($\Delta$Nx-y) versus biaxial stretching ratio curves of several copolyesters in one embodiment of the disclosure.

As shown in FIG. 4, the copolyester films in Examples 2, 7, and 12 stretched by the biaxial stretching times of 3×3 had birefringence coefficients (ΔNx-y) of $3.44 \times 10^{-4}$, $6.23 \times 10^{-4}$, and $1.08 \times 10^{-3}$, respectively, and the birefringence coefficients of the copolyester films in Examples 2, 7, and 12 are slightly increased with the increase of the biaxially stretching times. Compared to the PET film in the Comparative Example 1, the copolyester films in Examples 2, 7, and 12 stretched by the same biaxially stretching times had lower birefringence coefficients.

Figure 5:
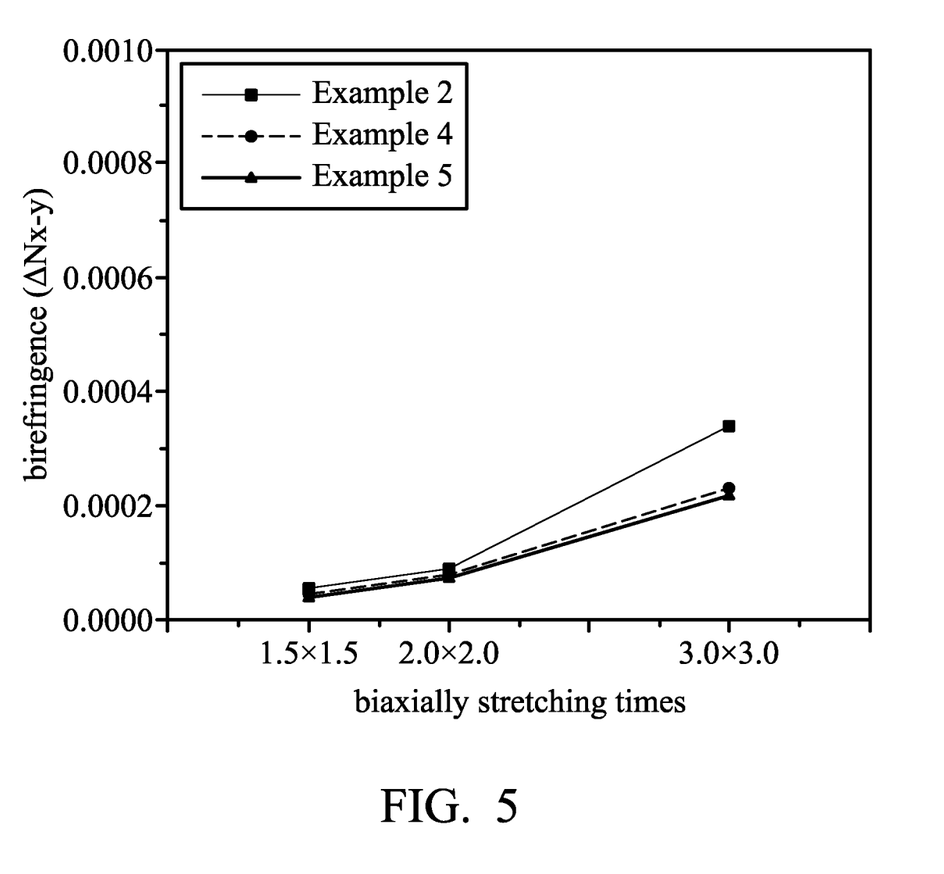
FIG. 5 shows birefringence ($\Delta$Nx-y) versus biaxial stretching ratio curves of several copolyesters in one embodiment of the disclosure.

As shown in FIG. 5, the copolyester films in Examples 2, 4, and 5 stretched by the biaxial stretching times of 3×3 had birefringence coefficients (ΔNx-y) of $3.44 \times 10^{-4}$, $2.33 \times 10^{-4}$, and $2.21 \times 10^{-4}$, respectively, and the birefringence coefficients of the copolyester films in Examples 2, 4, and 5 are slightly increased with the increase of the biaxially stretching times. Compared to the copolyester film in Example 2, the copolyester film including 0.5 wt % of silicon oxide in Example 4 and the copolyester film including 0.5 wt % of strontium carbonate in Example 5 stretched by the same biaxially stretching times had lower birefringence coefficients.

Figure 6:
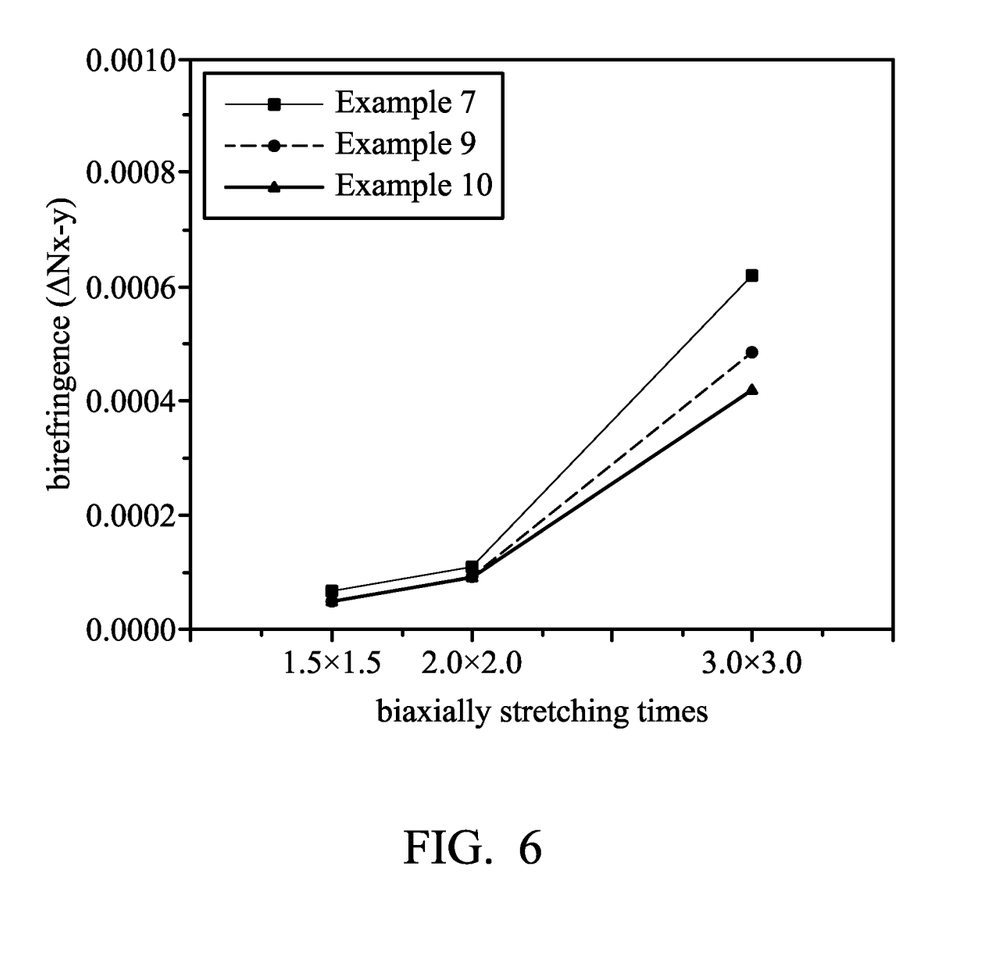
FIG. 6 shows birefringence ($\Delta$Nx-y) versus biaxial stretching ratio curves of several copolyesters in one embodiment of the disclosure.

As shown in FIG. 6, the copolyester films in Examples 7, 9, and 10 stretched by the biaxial stretching times of 3×3 had birefringence coefficients (ΔNx-y) of $6.23 \times 10^{-4}$, $4.85 \times 10^{-4}$, and $4.21 \times 10^{-4}$, respectively, and the birefringence coefficients of the copolyester films in Examples 7, 9, and 10 are slightly increased with the increase of the biaxially stretching times. Compared to the copolyester film in Example 7, the copolyester film including 0.5 wt % of silicon oxide in Example 9 and the copolyester film including 0.5 wt % of strontium carbonate in Example 10 stretched by the same biaxially stretching times had lower birefringence coefficients.

Figure 7:
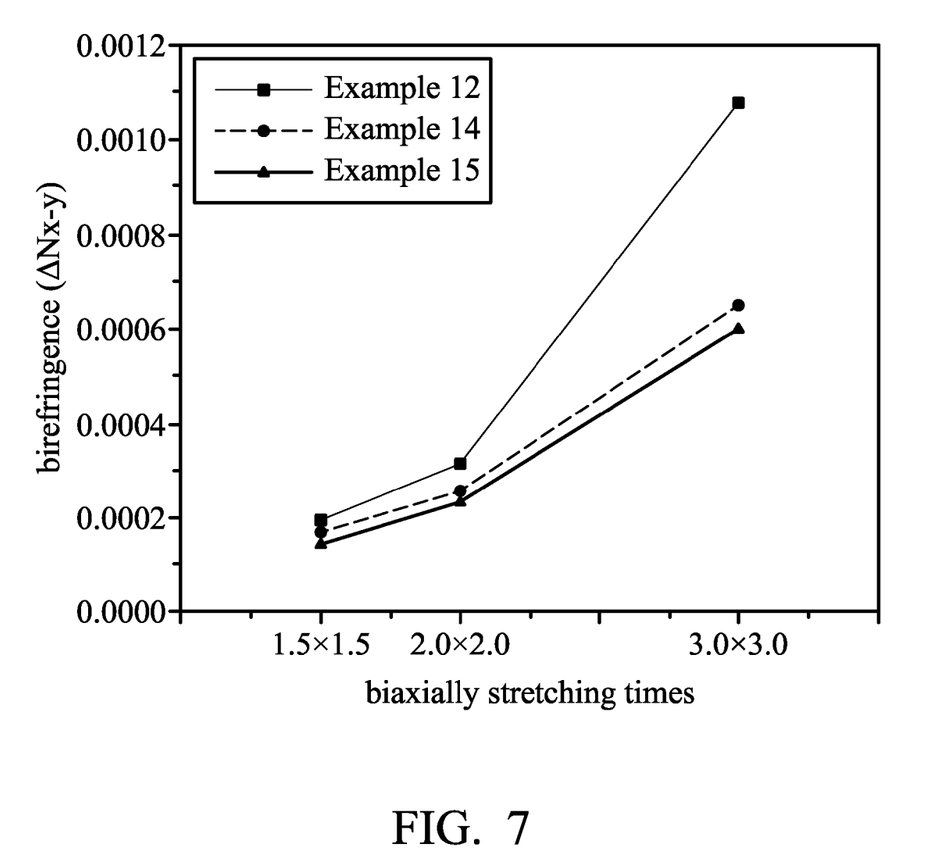
FIG. 7 shows birefringence ($\Delta$Nx-y) versus biaxial stretching ratio curves of several copolyesters in one embodiment of the disclosure.

As shown in FIG. 7, the copolyester films in Examples 12, 14, and 15 stretched by the biaxial stretching times of 3×3 had birefringence coefficients (ΔNx-y) of $1.08 \times 10^{-3}$, $6.50 \times 10^{-4}$, and $6.01 \times 10^{-4}$, respectively, and the birefringence coefficients of the copolyester films in Examples 12, 14, and 15 are slightly increased with the increase of the biaxially stretching times. Compared to the copolyester film in Example 12, the copolyester film including 0.5 wt % of silicon oxide in Example 14 and the copolyester film including 0.5 wt % of strontium carbonate in Example 15 stretched by the same biaxially stretching times had lower birefringence coefficients.

Figure 8:
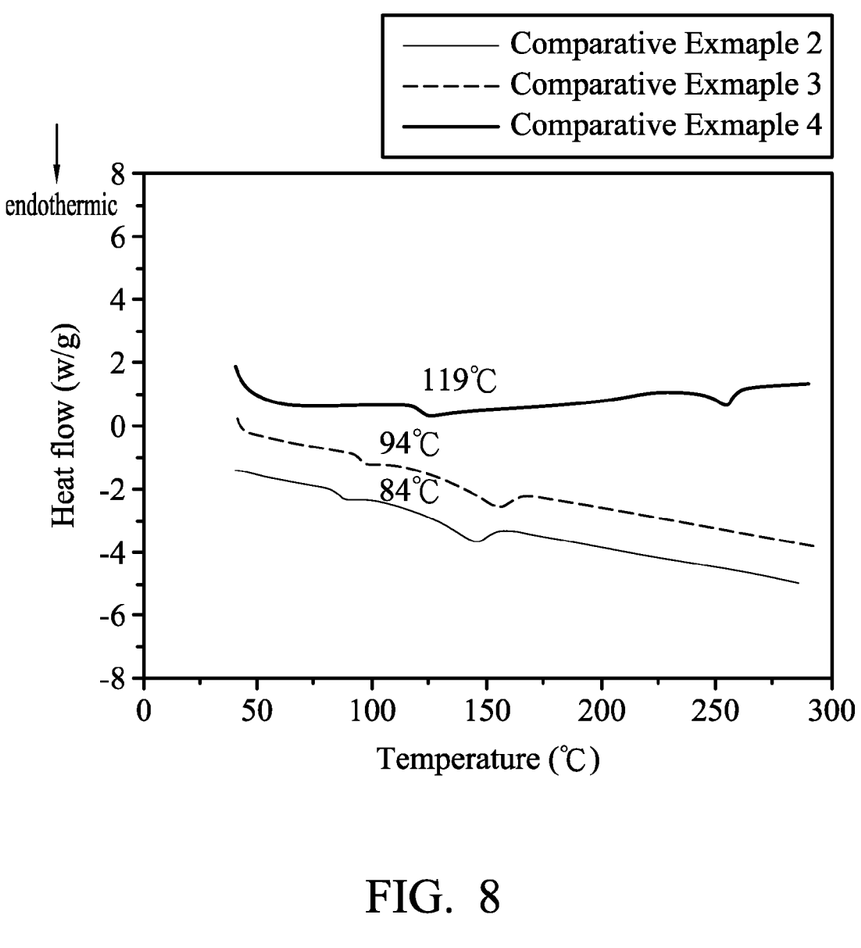
FIG. 8 shows heat flow versus temperature curves of several copolyesters analyzed by a differential scanning calorimeter in one embodiment of the disclosure.

As shown in FIG. 8, the copolyesters in Comparative Examples 2 to 4 were analyzed by the DSC to measure their Tg. Accordingly, the copolyesters in Examples 1 to 5 had Tg (96° C. to 120° C.) which was higher than the Tg (84° C.) of the copolyester in the Comparative Example 2, the copolyesters in Examples 6 to 10 had the Tg (104° C. to 126° C.) which was higher than the Tg (94° C.) of the copolyester in the Comparative Example 3, and the copolyesters in Examples 11 to 15 had the Tg (124° C. to 143° C.) which was higher than the Tg (119° C.) of the copolyester in the Comparative Example 4.

Comparative Example 5

166 g of TPA serving as diacid and 196 g of TCD serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 1.0 molar ratio of the repeating unit in Formula 1 and 0 molar ratio of the repeating unit in Formula 2 (A=1.0, B=0) was obtained. The intrinsic viscosity (0.67 dL/g) of the amorphous copolyester was measured by the Ubbelohde viscometer.

Comparative Example 6

222 g of 5tBIA serving as diacid and 196 g of TCD serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 1.0 molar ratio of the repeating unit in Formula 9 and 0 molar ratio of the repeating unit in Formula 10 (C=1.0, D=0) was obtained. The intrinsic viscosity (0.69 dL/g) of the amorphous copolyester was measured by the Ubbelohde viscometer.

Comparative Example 7

244 g of NDC serving as diacid and 196 g of TCD serving as diols were esterificated at 240° C. to 250° C. for about 4 hours, and then condensation polymerized with 350 ppm of antimony acetate at 280° C. to 290° C. for about 4 hours. After two steps of esterification and condensation polymerization, an amorphous copolyester having 1.0 molar ratio of the repeating unit in Formula 17 and 0 molar ratio of the repeating unit in Formula 18 (E=1.0, F=0) was obtained. The intrinsic viscosity (0.66 dL/g) of the amorphous copolyester was measured by the Ubbelohde viscometer.

The copolyesters of Comparative Examples 5 to 7 were analyzed by the DSC to measure their Tg, as tabulated in Table 1.

Copolyester pellets in Comparative Examples 5 to 7 were vibration sieved by a screen mesh to remove fine dust and fragments thereon. The sieved copolyester pellets were then dried by a hot air circulating oven at 70° C. for 24 hours to ensure the copolyester pellets being completely dried. The dried copolyester pellets were molten and processed by a twin screw extruder with a screw rotation rate of about 300 rpm to 500 rpm at a temperature of 220° C. to 270° C. Thereafter, the molten copolyester was extruded by a T-die. However, the copolyesters in Comparative Examples 5 to 7 had too low of a toughness to be extruded as a transparent plate.

In the Examples of the disclosure, different monomers were condensation polymerized to form a thin plate of a random amorphous copolyester with low birefringence, thereby overcoming the high birefringence problem of the conventional PET film. The copolyesters of specific compositions in the Examples had low haze, high transmittance, and low birefringence. The copolyester plate can be further biaxially stretched to form a film having high mechanical properties and uniform thickness. The film can be widely utilized as a substrate or optical film.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. An amorphous copolyester, polymerized of a diacid and diols,
wherein the diacid is selected from a group consisting of terephthalic acid and 5-tert-butylisophthalic acid,
wherein the diols are tricyclodecanedimethanol and at least one diol selected from the group consisting of ethylene glycol and 2,2-dimethyl-1,3-propanediol, and
the molar ratio of the tricyclodecanedimethanol is 30% to 95% of the diols.

2. The amorphous copolyester as claimed in claim 1, comprising:
an A molar ratio of a repeating unit and
a B molar ratio of a repeating unit wherein A+B=1, and 0.3≤A≤0.95.

3. The amorphous copolyester as claimed in claim 1, comprising:
a C molar ratio of a repeating unit and
a D molar ratio of a repeating unit wherein C+D=1, and 0.3≤C≤0.95.

4. An amorphous copolyester, comprising:
an E molar ratio of a repeating unit and
an F molar ratio of a repeating unit wherein E+F=1, and $0.7 \leq E \leq 0.95$.

5. The amorphous copolyester as claimed in claim 1, wherein the amorphous copolyester has an intrinsic viscosity of about 0.5 dL/g to 0.8 dL/g.

6. A substrate, comprising the amorphous copolyester as claimed in claim 1.

7. The substrate as claimed in claim 6, further comprising inorganic nano powders mixed into the amorphous copolyester, wherein the inorganic nano powders comprise silicon oxide, titanium oxide, calcium carbonate, strontium carbonate, barium sulfate, aluminum oxide, or combinations thereof, and the inorganic nano powders and the amorphous copolyester have a weight ratio of larger than 0:100 and less than or equal to 1:100.

8. An optical film, comprising the amorphous copolyester as claimed in claim 1.

9. The optical film as claimed in claim 8, further comprising inorganic nano powders mixed into the amorphous copolyester, wherein the inorganic nano powders comprise silicon oxide, titanium oxide, calcium carbonate, strontium carbonate, barium sulfate, aluminum oxide, or combinations thereof, and the inorganic nano powders and the amorphous copolyester have a weight ratio of larger than 0:100 and less than or equal to 1:100.

10. The optical film as claimed in claim 8, comprising an optical protective film of a liquid crystal display, a release film, a brightness enhancement film, a retardation film, a polarizer protective film, or an anti-reflection film.

11. A substrate, comprising the amorphous copolyester as claimed in claim 2.

12. A substrate, comprising the amorphous copolyester as claimed in claim 3.

13. A substrate, comprising the amorphous copolyester as claimed in claim 4.

14. A substrate, comprising the amorphous copolyester as claimed in claim 5.

15. An optical film, comprising the amorphous copolyester as claimed in claim 2.

16. An optical film, comprising the amorphous copolyester as claimed in claim 3.

17. An optical film, comprising the amorphous copolyester as claimed in claim 4.

18. An optical film, comprising the amorphous copolyester as claimed in claim 5.

* * * * *